March 11, 1930. R. S. TAYLOR 1,750,335
COMBINATION FILLING AND FUSIBLE PLUG FITTING
Filed April 21, 1927 2 Sheets-Sheet 1

INVENTOR
Robert Seth Taylor
BY
HIS ATTORNEY

March 11, 1930.   R. S. TAYLOR   1,750,335
COMBINATION FILLING AND FUSIBLE PLUG FITTING
Filed April 21, 1927   2 Sheets-Sheet 2
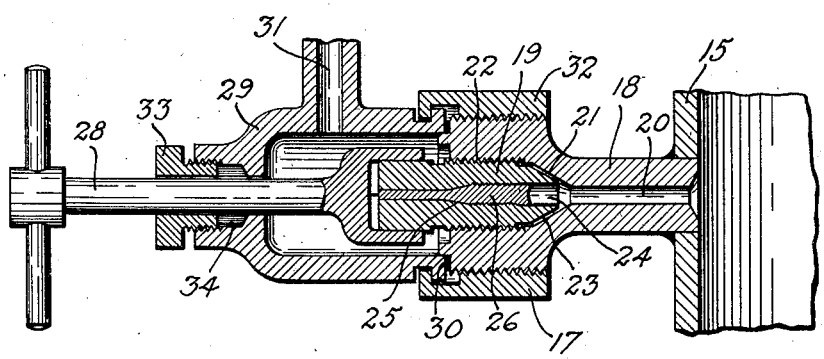
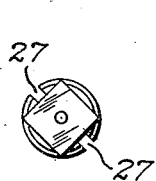
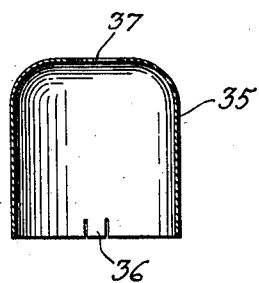
INVENTOR
Robert Seth Taylor
BY
his ATTORNEY Patented Mar. 11, 1930

1,750,335

UNITED STATES PATENT OFFICE

ROBERT SETH TAYLOR, OF BROOKLYN, NEW YORK, ASSIGNOR TO ELECTROLUX SERVEL CORPORATION, OF NEW YORK, N. Y., A CORPORATION OF DELAWARE

COMBINATION FILLING AND FUSIBLE PLUG FITTING

Application filed April 21, 1927. Serial No. 185,408.

My invention consists in a combined fusible plug and filling fixture for refrigerating apparatus and the like which is efficient and tight for purposes of filling and also tight as respects fusible material.

The nature of the invention will be apparent from the following description and accompanying drawings, of which:

Fig. 2 is a cross-sectional view of a fitting including my combined fusible and filling plug;

Fig. 3 is an end view of the fusible plug; and

Fig. 4 is a cross-section of a cap for the plug fitting.

Figure 1:
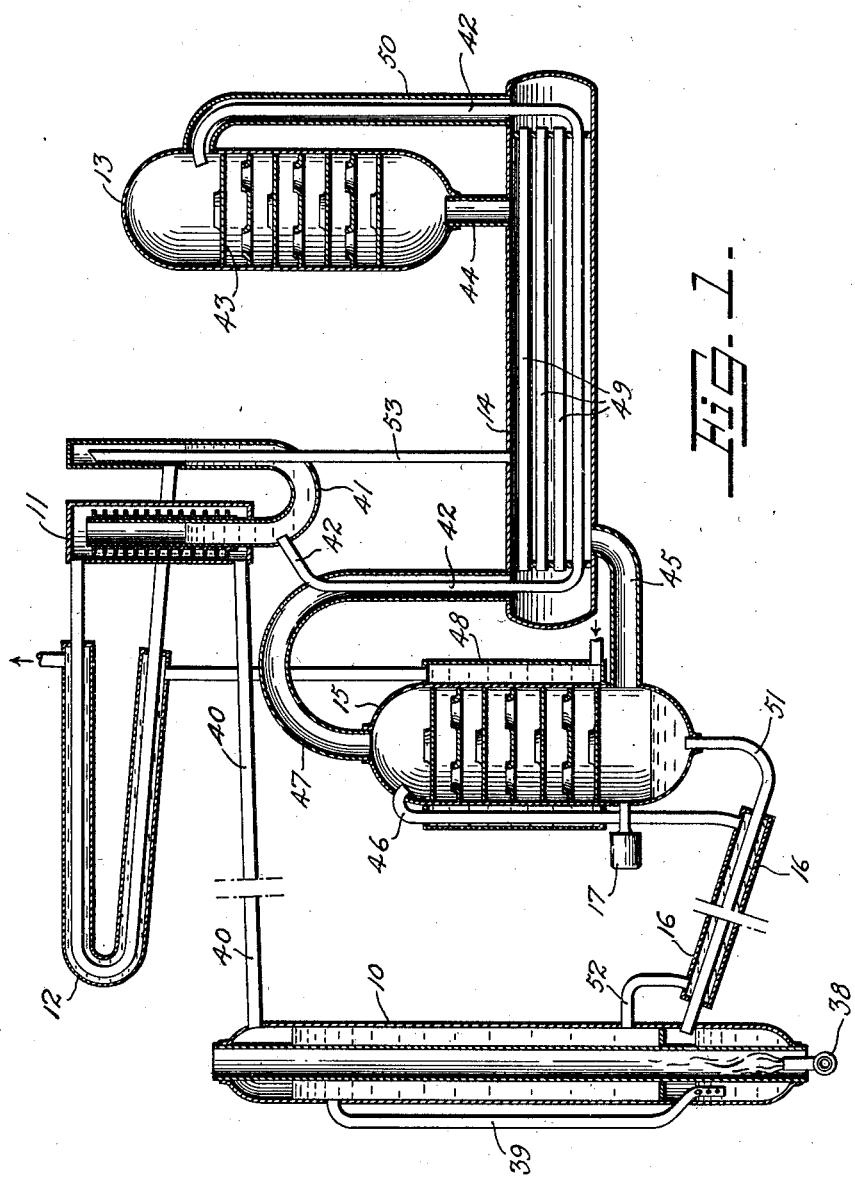
Fig. 1 is a cross-sectional view of a refrigerating system of the Platen-Munters type with my invention applied thereto.

The apparatus shown in Fig. 1 consists of a generator 10, a rectifier 11, a condenser 12, an evaporator 13, a gas heat exchanger 14, an absorber 15, and a liquid heat exchanger 16. The above members are in open communication with each other by means of suitably arranged conduits so that the same or substantially the same pressure exists throughout the entire apparatus. A combination charging and fusible plug fitting 17 is located in the side of absorber 15 above the surface of the liquid therein.

Fitting 17 is shown more in detail in Fig. 2. Reference character 18 designates the member into which the plug 19 fits. Member 18 is secured to absorber 15 in any suitable manner, as by welding. A passageway 20 extends centrally through member 18 and communicates with the interior of absorber 15. Passageway 20 is restricted at 21 so as to form a valve seat and is threaded at 22 to receive plug 19. The inner end of plug 19 is conical at 23 so as to seat in valve seat 21, forming a surface of passageway 20, when the plug is screwed in. A central channel 24 extends through plug 19 and is reduced in diameter at 25. Channel 24 is filled with a suitable fusible metal 26 such as an alloy of lead, tin and bismuth. Channel 24 is reduced at 25 as shown, so that pressure exerted on the inner end of fusible metal 26 will have no tendency to loosen the metal in the plug. Reduced portion 25 is, in effect, a valve seat, and the fusible metal 25 a valve seating against valve seat 25 and acting as an outwardly seating check valve to prevent leakage past its periphery. One or more slots 27 (Fig. 3) extend longitudinally along the threaded portion 22 of plug 19 and provide passageways for the flow of fluid therethrough when plug 19 is not screwed down tightly, so as to seat in valve seat 21. The outer end of plug 19 is suitably formed in the shape of a square, or the like, so as to fit into the hollow end of a socket wrench 28.

In Fig. 2 the filling plug is shown in conjunction with a preferred form of filling apparatus. It consists of a cap member or pressure body 29 which is secured to receptacle 18 by means of the flanged union 32. The exterior of union 32 is hexagonal so that a wrench may be fitted thereto. Leakage between members 18 and 29 is prevented by a washer 30. A conduit 31 communicates with the interior of cup member 29 and with evacuating means and a source of supply of fluids with which the absorption apparatus is to be charged. A packing gland 33 screws into an opening in the outer end of cap 29 and serves to force packing 34 against the shank of wrench 28 and thus prevent leakage thereby. Wrench 28 may move longitudinally through packing 34 as well as rotate therein.

In Fig. 4 is shown a cap 35 to be placed on receptacle 18 after the apparatus has been charged and member 29 removed. Cap 35 may screw on in place of member 29, or, as is shown, it may be adapted to simply slip over the threads. In this case lugs 36 are provided which are bent inwardly after cap 35 is in place and thus secure it. An aperture 37 is formed in the outer end of cap 35.

The procedure in charging the apparatus is as follows: Plug 19 is screwed part way into member 18 and cap member 29 is tightly screwed on member 18 as shown in Fig. 2. Conduit 31 is connected to the evacuating means and the air is removed from the system. The air passes from the various parts of the system to the absorber and thence through passageway 20 and slots 27 into cap member 29 from where it is removed through conduit 31. After the air has been removed, liquid is admitted to conduit 31 and is sucked into absorber 15 from whence part of it passes into the lower part of generator 10. After a sufficient quantity of liquid has been admitted, gas under pressure, is admitted to conduit 31 and passes into the absorber and fills all of the apparatus not occupied by the liquid. For the sake of illustration, the liquid above referred to will be considered to be a solution of ammonia dissolved in water and the gas to be hydrogen, which is inert with respect to ammonia. After the apparatus is fully charged, plug 19 is screwed tightly into receptacle 18 by means of wrench 28. The conical section 23 of plug 19 seats in seat 21 and effectively closes passageway 20. Wrench 28 is then withdrawn far enough to disengage plug 19 and cap member 29 is then unscrewed and is replaced by cap 35.

The operation of the refrigerating apparatus is as follows: The application of heat from a gas burner 38 causes a mixture of liquid and vapor to pass upwardly through a conduit to the upper part of generator 10. Here the liquid is further heated and a considerable quantity of the ammonia is driven out of solution. The vaporous ammonia thus liberated passes through conduit 40 to rectifier 11. The ammonia vapor passes from rectifier 11 into condenser 12 where it is condensed to a liquid and passes into U-shaped member 41. The liquid ammonia fills up member 41 and conduit 42 until a sufficient head is attained to cause flow through conduit 42 to the upper part of evaporator 13. Hydrogen gas which is in generator 10, rectifier 11 and condenser 12 when the apparatus is started, is displaced therefrom by the ammonia and passes through conduit 53 to heat exchanger 14. Thereafter conduit 53 continues to serve as a passageway to prevent the formation of a pocket by hydrogen in member 41. In the evaporator, the liquid ammonia is distributed over disks 43 therein and is brought in intimate contact with the hydrogen gas. The ammonia evaporates in the presence of the hydrogen and the drop in temperature produces refrigeration. The vaporous mixture of ammonia and hydrogen thus formed, being heavier than pure hydrogen, passes downwardly through evaporator 13 and conduit 44 to heat exchanger 14.

From heat exchanger 14 the mixture passes through conduit 45 to absorber 15. In the absorber the mixture comes in intimate contact with water containing but little ammonia in solution, which is admitted through conduit 46. The water absorbs the ammonia and the lighter hydrogen, thus liberated from the mixture, passes upwardly through absorber 15 and through conduit 47 to one end of heat exchanger 14. The heat resulting from this absorption is carried away by cooling water in water jacket 48.

The hydrogen passes from one end of heat exchanger 14 through tubes 49 to the other end of the heat exchanger and thence through conduit 50 to the upper part of evaporator 13. Here it again mixes with ammonia. The purpose of heat exchanger 14 is to utilize the low temperature of the vaporous mixture of ammonia and hydrogen, leaving the evaporator to pre-cool the hydrogen in tubes 49 and the ammonia in conduit 42 before they enter the evaporator.

The strong solution of ammonia in water formed in the absorber passes therefrom through conduit 51 to the lower part of generator 10. It is then circulated as before described to the upper part of generator 10 and the ammonia driven out of solution. The weak solution passes downwardly through generator 10 and through conduit 52, heat exchanger 16 and conduit 46 to the upper part of absorber 15. In heat exchanger 16 a transfer of heat takes place from the hot weak solution therein to the cool strong solution in conduit 51. The weak solution in conduit 46 is further cooled by being brought in heat exchange relation with the cooling water in water jacket 48.

In the eventuality that the building in which such an apparatus is installed catches fire and the entire apparatus is subjected to great heat, the pressure within the apparatus will, of course, increase. However, before the pressure can rise above a certain value, which is well below the danger point, a temperature sufficiently high to melt fusible metal 26 in plug 19 must be reached. The charge passes out through passageways 20 and 24 and aperture 37 in cap 35. Thus the danger of the apparatus bursting during a fire and perhaps injuring a fireman or others nearby is done away with.

It will be understood that variations of structure are intended to fall within the scope of the invention.

Having thus described my invention, what I claim is:

1. A combined fusible and filling plug fitting comprising a member having a passageway through the same adapted to receive a plug, a plug for said passageway, said plug and passageway having coacting surfaces forming a valve closure, said plug being formed to permit passage of fluid past the same when said plug is in some positions in said passageway but prevent passage of fluid past the same when said surfaces coact, a channel through said plug and fusible metal in said channel.

2. A combined fusible and filling plug fitting comprising a member having a passageway through the same adapted to receive a plug, a plug for said passageway, said plug and passageway having coacting surfaces forming a valve closure, said plug being formed to permit passage of fluid past the same when said plug is in some positions in said passageway but prevent passage of fluid past the same when said surfaces coact, a channel through said plug having a restricted portion and fusible metal in said channel acting as a valve against said restricted portion.

3. A combined fusible and filling plug fitting comprising a member having a passageway through the same adapted to receive a plug, a plug inserted into said passageway, a seat surface in said passageway, an inner valve surface on said plug adapted to be pressed against said seat, said plug being formed to permit passage of fluid past the same when said plug is in some positions in said passageway but to prevent passage of fluid past the same when said valve surface is seated, a channel through said plug having a restricted seat portion and fusible metal in said channel acting as a valve against said seat portion in direction away from the first mentioned seat.

4. A fusible plug having an outer taper at one end to form a valve, a threaded portion, one or more peripheral slots extending longitudinally along said threaded portion to form a fluid passageway, a central channel, fusible material in the central channel, said channel and fusible material having coacting surfaces tapering oppositely to said outer taper.

5. A combined fusible and filling plug fitting for a refrigerating apparatus comprising a member having a passageway through the same adapted to receive a plug, a plug for said passageway, said plug and passageway having coacting surfaces forming a valve closure, said plug being formed to permit passage of fluid past the same when said plug is in some positions in said passageway but prevent passage of fluid past the same when said surfaces are coacting, a channel through said plug, fusible metal in said channel, a pressure body adapted to fit over said member and form a conduit for passing fluid under pressure through said member and means adapted to be operated from outside the pressure body to advance the plug into the passage to cause the surfaces to coact and form a valve closure while the pressure body contains fluid under pressure.

6. A combined fusible and filling plug fitting for a refrigerating apparatus comprising a member having a passageway through the same adapted to receive a plug, a plug for said passageway, said plug and passageway having coacting surfaces forming a valve closure, said plug being formed to permit passage of fluid past the same when said plug is in some positions in said passageway but prevent passage of fluid past the same when said surfaces coact, a channel through said plug having a restricted portion, fusible metal in said channel acting as a valve against said restricted portion, a pressure body adapted to fit over said member and form a conduit for passing fluid under pressure through said member and means adapted to be operated from outside said pressure body to move the plug within the passage so that the said surfaces coact to form a valve closure while the pressure body contains fluid under pressure.

7. A combined fusible and filling plug fitting for a refrigerating apparatus comprising a member having a passageway through the same adapted to receive a plug, a plug inserted into said passageway, a seating surface in said passageway, an inner valve surface on said plug adapted to be pressed against said seat, said plug being formed to permit passageway of fluid past the same when said plug is in some positions in said passageway but to prevent passage of fluid past the same when said valve surface is seated, a channel through said plug having a restricted seat portion, fusible metal in said channel acting as a valve against said seat portion in direction away from the first mentioned seat, a pressure body adapted to fit over said member forming a conduit for passing fluid under pressure through said member and means adapted to be operated from outside said pressure body to move the plug in the passageway to press the inner valve surface against said seat while the pressure body contains fluid under pressure.

8. Refrigerating apparatus comprising a generator, a condenser, an evaporator, an absorber, means connecting the aforementioned parts to form cycles of circulation for fluids, the arrangement being such that substantially the same pressure exists throughout the entire apparatus, the said apparatus including a combined fusible and filling plug fitting comprising a member having a passageway through the same adapted to receive a plug, a plug for said passageway, said plug and passageway having coacting surfaces forming a valve closure, said plug being formed to permit passage of fluid past the same when said plug is in some positions in said passageway but prevent passage of fluid past the same when said surfaces coact, a channel through said plug and fusible metal in said channel.

9. Refrigerating apparatus comprising a generator, a condenser, an evaporator, an absorber, means connecting the aforementioned parts to form cycles of circulation for fluids, the arrangement being such that substantially the same pressure exists throughout the entire apparatus, the said apparatus including a combined fusible and filling plug fitting comprising a member having a passageway through the same adapted to receive a plug, a plug inserted into said passageway, a seat surface in said passageway, an inner valve surface on said plug adapted to be pressed against said seat, said plug being formed to permit passage of fluid past the same when said plug is in some positions in said passageway but to prevent passage of fluid past the same when said valve surface is seated, a channel through said plug having a restricted seat portion and fusible metal in said channel acting as a valve against said seat portion in direction away from the first mentioned seat.

10. Refrigerating apparatus comprising a generator, a condenser, an evaporator, an absorber, means connecting the aforementioned parts to form cycles of circulation for fluids, the arrangement being such that substantially the same pressure exists throughout the entire apparatus, the said apparatus including a combined fusible and filling plug fitting comprising a member having a passageway through the same adapted to receive a plug, a plug for said passageway, said plug and passageway having coacting surfaces forming a valve closure, said plug being formed to permit passage of fluid past the same when said plug is in some positions in said passageway but prevent passage of fluid past the same when said surfaces are coacting, a channel through said plug, fusible metal in said channel, a pressure body adapted to fit over said member and form a conduit for passing fluid under pressure through said member and means adapted to be operated from outside the pressure body to advance the plug into the passage to cause the surfaces to coact and form a valve closure while the pressure body contains fluid under pressure.

11. Refrigerating apparatus comprising a generator, a condenser, an evaporator, an absorber, means connecting the aforementioned parts to form cycles of circulation for fluids, the arrangement being such that substantially the same pressure exists throughout the entire apparatus, the said apparatus including a combined fusible and filling plug fitting comprising a member having a passageway through the same adapted to receive a plug, a plug for such passageway, said plug and passageway having coacting surfaces forming a valve closure, said plug being formed to permit passage of fluid past the same when said plug is in some positions in said passageway but prevent passage of fluid past the same when said surfaces coact, a channel through said plug having a restricted portion, fusible metal in said channel acting as a valve against said restricted portion, a pressure body adapted to fit over said member and form a conduit for passing fluid under pressure through said member and means adapted to be operated from outside said pressure body to move the plug within the passage so that the said surfaces coact to form a valve closure while the pressure body contains fluid under pressure.

In testimony whereof I hereunto affix my signature.

ROBERT SETH TAYLOR.